United States Patent
Fischerkeller

[11] Patent Number: 5,890,518
[45] Date of Patent: Apr. 6, 1999

[54] THROTTLE DEVICE FOR A PRESSURE CONTROL APPARATUS

[75] Inventor: Rolf Fischerkeller, Walheim, Germany

[73] Assignee: Robert Bosch GmbH, Stuttgart, Germany

[21] Appl. No.: 907,081

[22] Filed: Aug. 6, 1997

[30] Foreign Application Priority Data

Aug. 6, 1996 [DE] Germany ................. 196 31 666.9

[51] Int. Cl.[6] ................................................. F15D 1/02
[52] U.S. Cl. ................................ 138/45; 138/46; 123/514
[58] Field of Search .................... 138/45, 46; 123/511, 123/513, 514

[56] References Cited

U.S. PATENT DOCUMENTS

| | | | |
|---|---|---|---|
| 2,664,095 | 12/1953 | Magni | 138/45 |
| 2,899,979 | 8/1959 | Dahl et al. | 138/45 |
| 3,566,902 | 3/1971 | Muller | 138/45 |
| 4,228,956 | 10/1980 | Varner | 138/46 |
| 4,492,339 | 1/1985 | Kreitzberg | 138/45 |
| 5,141,029 | 8/1992 | Naugle et al. | 138/45 |
| 5,241,931 | 9/1993 | Radel | 123/514 |
| 5,285,759 | 2/1994 | Terada et al. | 123/514 |

FOREIGN PATENT DOCUMENTS 23 54 561  5/1975  Germany .

*Primary Examiner*—Denise L. Ferensic
*Assistant Examiner*—James F. Hook
*Attorney, Agent, or Firm*—Edwin E. Griegg; Ronald E. Greigg

[57] ABSTRACT

In a throttle device for a pressure control apparatus, the return line inside a pressure control valve or in the line course outside it is provided with a cross-sectional constriction that throttles the flow. This cross-sectional constriction is variable automatically, as a function of the flow rate and hence of the prevailing pressure, in such a way that at a low flow rate a small flow cross section and at a high flow rate a large flow cross section results. It is thus possible to design the return line pressure as high as possible over a wide range of the flow rate and to keep the pressure difference between the inflow line and return line slight and thereby to minimize the noise production in the pressure control valve.

20 Claims, 1 Drawing Sheet

THROTTLE DEVICE FOR A PRESSURE CONTROL APPARATUS

BACKGROUND OF THE INVENTION

The invention is based on a throttle device for a pressure control apparatus.

To regulate the pressure in a fuel supply system of an internal combustion engine, a pressure control apparatus that contains a pressure control valve is typically used. This valve is located on the compression side of a fuel pump that communicates with a tank. Some of the fuel pumped by the fuel pump is delivered to the engine via injection valves. In many internal combustion engines, one injection valve per cylinder is provided. The need is for the injection valves to inject the precise correct fuel quantity at any given moment, with only a very slight allowable deviation among the injection valves. The excess fuel quantity not needed by the engine is returned in the return line to the fuel tank via the pressure control valve. The pressure control valve regulates the pressure on the compression side of the fuel pump. In different motor vehicles, components are inserted into the return line leading back from the pressure control valve to the tank, in order to influence the return pressure. These components may for instance be a jet pump and/or a control valve. As such components, throttle devices which effect a throttling action by cross-sectional constriction have also already been proposed. This is in recognition of the fact that the noise produced by the pressure control valve and caused by the expansion of the fuel of the valve seat can be reduced by increasing the pressure in the return line. This reduces the pressure difference between the inflow line and the return line and thus reduces the noise produced. In known throttle devices, the throttling is achieved by means of a cross-sectional constriction in the return line. The flow cross section must be large enough that the return line pressure, if the flow rate is high, does not reach the inflow line pressure, in which case the control function would be lost. As a result, with a lesser flow rate there is a lesser return line pressure and hence a large pressure difference between the inflow and return lines. Because of a varying pressure difference between the inflow and return lines, a reduction in noise produced by the pressure control valve is hardly achievable.

OBJECT AND SUMMARY OF THE INVENTION

The throttle device according to the invention has the advantage over the prior art that the throttle cross section changes with the magnitude of the flow rate in the return line. At a low flow rate, a small flow cross section at the throttle restriction results, so that the throttling can be designed to be correspondingly pronounced for lesser flow rates. At high flow quantities, a large flow cross section results at the throttle restriction. It is thus possible to design the return line pressure as high as possible over a relatively wide flow rate range and thus to keep the pressure difference between the inflow and return lines low over nearly the entire flow rate range in the return line and in this way to reduce the noise produced by the pressure control valve.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
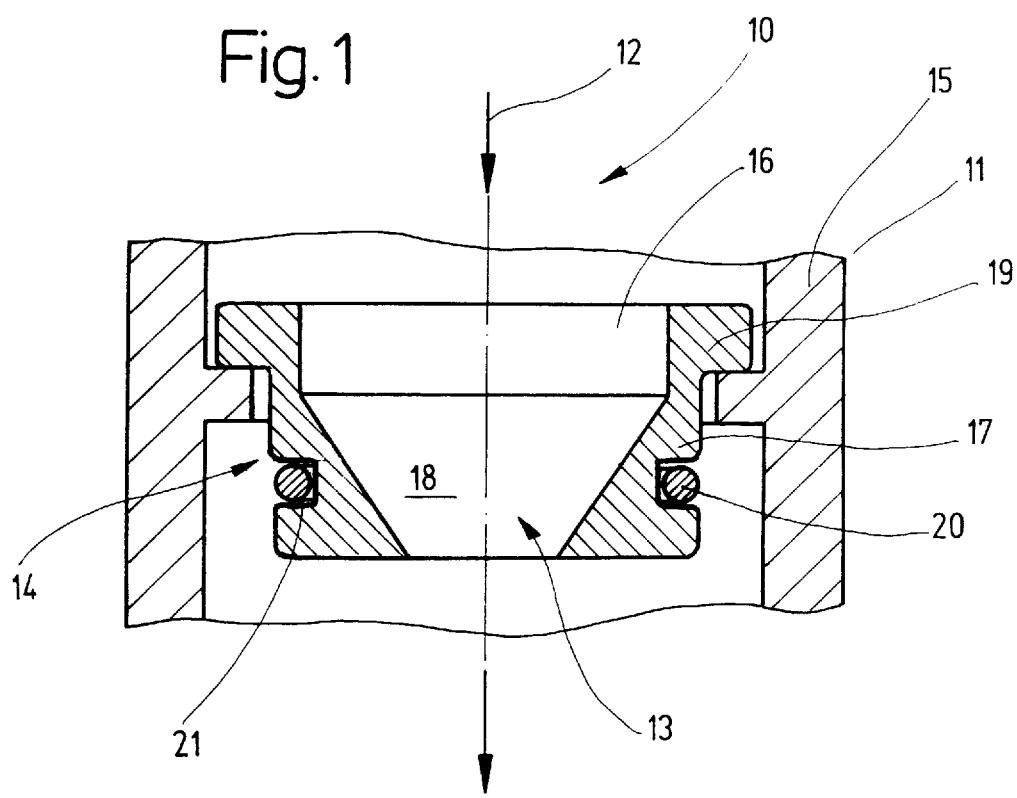
FIG. 1 is a schematic section through a throttle device for a pressure control apparatus.

FIG. 1 schematically shows a throttle device 10 for a pressure control apparatus, not further shown here. The pressure control apparatus can be used preferentially in internal combustion engines in which a pressure of the fuel in the fuel supply system is to be regulated. Such a pressure regulating device has a diaphragm-controlled pressure control valve, for instance, with an inflow and return line, that discharges into its pressure chamber, for the medium, in particular fuel, as shown and described for instance in German Patent DE 23 54 461 C2. The return line discharges into a conduit, located in the interior of the pressure chamber, that has a valve opening which is controlled by a closure member connected to a diaphragm, being controlled for instance as a function of a negative pressure in a line, such as the intake tube of the engine. The return line is embodied both by a conduit located in the interior of the pressure control valve and by an external return line that communicates with a supply tank for the medium, in particular fuel. From this tank, via the inflow line, fuel is pumped into the pressure chamber of the pressure control valve by means of a fuel pump that for instance is driven electrically. Fuel not needed by the engine flows through the pressure control valve back to the return line and from there back to the tank. The pressure control valve regulates the pressure on the compression side of the fuel pump. It is known to insert components that affect the return line pressure into the return line leading from the pressure control valve back to the tank; these components may for instance be a jet pump and/or a control valve. Throttle devices in the return line have also already been proposed. These provisions are intended to reduce the noise originating in the pressure control valve; this is because the expansion of the fuel in the valve seat in the pressure control valve generates noise, which one seeks to reduce by raising the pressure in the return line by throttling action. Raising the pressure in the return line reduces the pressure difference between the inflow line and the return line and thus lessens the noise. The known throttle devices proposed previously are characterized by a cross-sectional constriction in the return line. The result is then throttling by a constant cross section in the return line. Throttle devices of this kind are problematic, however, because the cross section must be large enough for the return line pressure, in the presence of a high flow rate, still to be markedly below the inflow line pressure and not to reach the inflow line pressure, for instance, because that makes the pressure regulating function of the pressure control valve useless. When there is a low flow rate, a large cross section that meets this demand leads to a low return line pressure and hence a correspondingly large pressure difference between the inflow line and the return line, but as a result hardly any noise abatement is then obtained.

Figure 2:
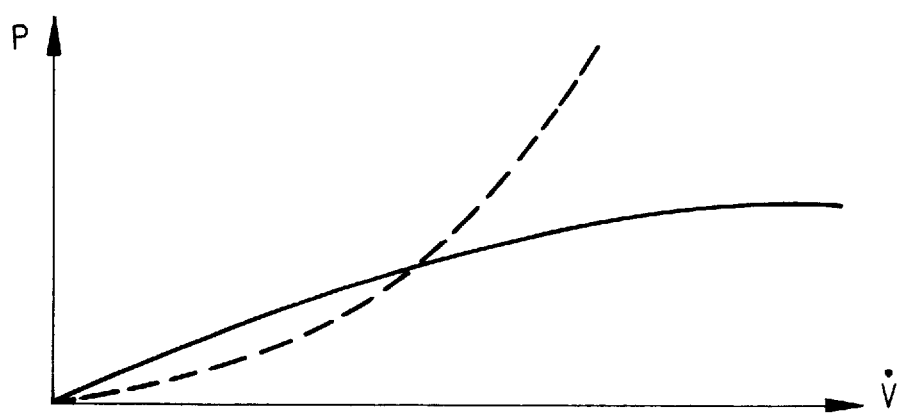
FIG. 2 is a graph showing a throttle curve in dashed lines for a known throttle device and a throttle curve in solid lines for the throttle device of the invention.

The throttle device 10 of the invention provides a remedy for this. The throttle device 10 is provided in the return line 11, which is shown only schematically; the course of the fuel in the return line 11 is presented by an arrow 12. The throttle device 10 has a cross-sectional constriction, generally identified by reference numeral 13, which throttles the flow in the direction of the arrow 12 and whose flow cross section is variable, in this case preferentially as a function of the flow rate. The arrangement is such that the flow cross section of the cross-sectional constriction 13 is variable automatically, for instance in such a way that with a low flow rate a small flow cross section results, and with a high flow rate a large flow cross section results. The flow cross section of the cross-sectional constriction 13 is preferably variable in such a way that the small flow cross section when the flow rate is low, as shown in FIG. 1, increases with a high flow rate and automatically decreases accordingly as the flow rate drops again. The variation in the flow cross section of the cross-sectional constriction 13 is essentially continuous. This is clearly shown by the shallow throttle curve drawn in solid lines in FIG. 2, which is associated with the throttle device 10 of the invention. In comparison with the throttle curve shown in dashed lines, which is associated with a throttle device of constant cross section, it is apparent that in the invention the throttle curve is made shallower because of the variable cross section of the cross-sectional constriction 13 as the flow rate V* rises. This makes it possible to design the pressure P in the return line 11 as high as possible over a wide range of the flow rate and thereby to minimize the noise originating in the pressure control valve. The throttling can then be designed as correspondingly pronounced even at lesser flow rates in the return line 11.

The variable cross-sectional constriction 13 in the return line 11 of the pressure control apparatus, not shown, may be disposed selectively either inside the pressure control valve, not shown, or outside it instead, and thus in the course of the return line.

In the exemplary embodiment of the throttle device 10 shown, the variable cross-sectional constriction 13 is formed by means of a line segment 14 that is inserted selectively either into the return line in the interior of the pressure control valve, not shown, or outside this valve into the return line of the pressure control apparatus; in FIG. 1, a pipe segment 15 is schematically indicated for this purpose; in the first case above, it is for instance a pressure control neck in the interior of a pressure control valve, or in the other case it is a portion of a return line. The line segment 14 is fixed in a suitable way in the pipe segment 15. It includes an inflow opening 16 of large cross section and an adjoining portion 17 with an outflow opening 18 that originates at the inflow opening 16 and becomes narrower in the direction of the return flow (arrow 12). The outflow opening 18 is preferably automatically variable in terms of its flow cross section. The portion 17 that contains the narrowing outflow opening 18 can be widened radially from the inside outward automatically under the influence of the flow passing through the line segment 14 in the direction of the arrow 12 and as a function of the magnitude of this flow with an increase in the flow cross section. As the flow rate rises, the pressure in the outflow opening 18 increases, the result automatically being the widening and hence enlargement of the outflow opening 18. Thus with a low flow rate a small cross section of the outflow opening 18 and with a high flow rate a large opening cross section of the outflow opening 18 are achieved. As a result, the throttling action can be designed to be correspondingly strong even with a low flow rate. It is possible for the return line pressure to be designed as high as possible over a relatively wide range of the flow rate and thereby to achieve a minimization of the noise produced by the pressure control valve.

At least the portion 17 of the line segment 14 that contains the narrowing outflow opening 18 may be embodied as elastically deformable, while the remainder 19 that includes this segment 17 and the inflow opening 16, can be embodied as nondeformable. The two parts 19 and 17 are preferably combined integrally into a single component, but this is not compulsory. It may be advantageous if this component that forms the line segment 14 is formed of an annular part made of an elastomer, whose portion 17 including the narrowing outflow opening 18 is embodied as soft enough that the flow cross section of the outflow opening 18 can be varied by widening, in the manner described.

It may also be advantageous if at least the portion 17 that includes the narrowing outflow opening 18 is embraced by at least one resilient element 20, formed for instance from an encompassing open or split ring, which is retained in an outer annular groove 21 of the portion 17. In another exemplary embodiment, not shown, the at least one resilient element 20 can instead be formed by an encompassing, closed helical spring or a sleeve or some other kind of spring element, for instance similar to a wave seal ring. By means of the resilient element 20, the extent of the widening of the portion 17, thus changing the flow cross section of the outflow opening 18, can be varied.

In another exemplary embodiment not shown, the variation of the flow cross section of the cross-sectional constriction 13 is accomplished in the sense of a widening or reduction by means of an actuating device. Such an actuating device can engage the portion 17 on the inside or outside to produce widening or constriction, respectively.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A throttle device for pressure control apparatus, which is used for fuel supply systems for internal combustion engines and a pressure control valve; said pressure control apparatus comprises a diaphragm, an inflow return line for a pressure medium, said inflow return line discharges into a pressure chamber of said pressure control valve, the inflow return line (11) is provided with a cross-sectional constriction (13) having a variable flow cross section that throttles the pressure medium flow, the variable cross-sectional constriction (13) is formed by means of a line segment (14), which has an inflow opening (16) of large cross section and an adjoining portion (17) with an outflow opening (18) that originates at the inflow opening (16) and narrows in a direction of the return flow, the portion (17) includes the narrowing outlet opening (18) embodied as an elastic material which is widened automatically under an influence of the pressure flow and as a result of a function of a magnitude of the pressure flow, causing enlargement of the flow cross section, and the portion including the narrowing outlet opening (18) is embraced by at least one resilient ring element (20).

2. A throttle device in accordance with claim 1, in which the flow cross section of the cross-sectional constriction (13) is variable as a function of the flow rate.

3. A throttle device in accordance with claim 1, in which the flow cross section of the cross-sectional constriction (13) is automatically variable as a function of the flow rate.

4. A throttle device in accordance with claim 1, in which the flow cross section of the cross-sectional constriction (13) is variable in such a way that at a low flow rate, a small flow cross section is formed and at a high flow rate, a large flow cross section result.

5. A throttle device in accordance with claim 1, in which the f low cross section of the cross sectional constriction (13) is at least substantially continuously variable.

6. A throttle device in accordance with claim 1, in which the variable cross-sectional constriction (13) in the return line (11) of the pressure control apparatus is disposed outside the pressure control valve in the course of the return line.

7. A throttle device in accordance with claim 1, in which the outflow opening (18) is variable automatically.

8. A throttle device in accordance with claim 1, in which the portion (17) including the narrowing outlet opening (18) is widened automatically under an influence of the pressure flow and as a result of a function of a magnitude of the pressure flow, causing enlargement of the flow cross section.

9. A throttle device in accordance with claim 1, in which the line segment (14) is formed of an annular part comprising an elastomer having a soft portion (17) including the narrowing outlet opening (18).

10. A throttle device in accordance with claim 9, in which the line segment (14) is inserted into the return line in an interior of the pressure control valve.

11. A throttle device in accordance with claim 9, in which the line segment (14) is inserted into the return line outside of the valve into the return line.

12. A throttle device for a pressure control apparatus, which is used for fuel supply systems for internal combustion engines, said pressure control apparatus comprises a diaphragm-controlled pressure control valve; an inflow return line for a pressure medium, said inflow return line discharges into a pressure chamber of said pressure control valve, the inflow return line (11) is provided with a cross-sectional constriction (13) having a variable flow cross-section that throttles the pressure medium flow, the variable cross-sectional constriction (13) is formed by means of a line segment (14), which has an inflow opening (16) of large cross section and an adjoining portion (17) with an outflow opening (18) that originates at the inflow opening (16) and narrows in a direction of the return flow, the portion (17) includes the narrowing outlet opening (18) embodied as an elastic material which is widened automatically under an influence of the pressure flow and as a result of a function of a magnitude of the pressure flow, causing enlargement of the flow cross section, and the portion including the narrowing outlet opening (18) is embraced by at least one closed helical spring element.

13. A throttle device in accordance with claim 12, in which the flow cross section of the cross-sectional constriction (13) is variable as a function of the flow rate.

14. A throttle device in accordance with claim 12, in which the flow cross section of the cross-sectional constriction (13) is automatically variable as a function of the flow rate.

15. A throttle device in accordance with claim 12, in which the flow cross section of the cross-sectional constriction (13) is variable in such a way that at a low flow rate, a small flow cross section is formed and at a high flow rate, a large flow cross section result.

16. A throttle device in accordance with claim 12, in which the flow cross section of the cross sectional constriction (13) is at least substantially continuously variable.

17. A throttle device in accordance with claim 12, in which the variable cross-sectional constriction (13) in the return line (11) of the pressure control apparatus is disposed outside the pressure control valve in the course of the return line.

18. A throttle device in accordance with claim 12, in which the outflow opening (18) is variable automatically.

19. A throttle device in accordance with claim 12, in which the portion (17) including the narrowing outlet opening (18) is widened automatically under an influence of the pressure flow and as a result of a function of a magnitude of the pressure flow, causing enlargement of the flow cross section.

20. A throttle device in accordance with claim 12, in which the line segment (14) is formed of an annular part comprising an elastomer having a soft portion (17) including the narrowing outlet opening (18).

* * * * *